United States Patent [19]

French et al.

[11] 4,425,641
[45] Jan. 10, 1984

[54] TIME DIVISION MULTIPLEX TELECOMMUNICATION DIGITAL SWITCHING MODULES

[75] Inventors: Joseph A. French, Poole; Thomas S. Maddern; Alexander S. Philip, both of Wimborne, all of England

[73] Assignee: The Plessey Company plc, Ilford, England

[21] Appl. No.: 276,494

[22] Filed: Jun. 23, 1981

[30] Foreign Application Priority Data

Jun. 25, 1980 [GB] United Kingdom ................. 8020755

[51] Int. Cl.$^3$ ............................................ H04Q 11/04
[52] U.S. Cl. ...................................... 370/64; 370/58; 370/68
[58] Field of Search ......... 179/18 ES, 18 EE, 18 EA, 179/18 FC; 370/65, 59, 63, 58, 64, 68

[56] References Cited

U.S. PATENT DOCUMENTS

| | | | |
|---|---|---|---|
| 4,114,143 | 9/1978 | Karnaugh | 370/58 |
| 4,122,310 | 10/1978 | Ryden et al. | 370/58 |
| 4,127,742 | 11/1978 | Couturier et al. | 179/18 FC |
| 4,186,277 | 1/1980 | Schlichte | 370/58 |
| 4,201,889 | 5/1980 | Lawrence et al. | 370/68 |
| 4,201,890 | 5/1980 | Lawrence et al. | 370/68 |
| 4,201,891 | 5/1980 | Lawrence et al. | 370/58 |
| 4,245,339 | 1/1981 | Agricola et al. | 370/58 |
| 4,320,501 | 3/1982 | Le Dieu et al. | 370/63 |
| 4,335,456 | 6/1982 | Gaiser et al. | 370/58 |

Primary Examiner—Gerald L. Brigance
Attorney, Agent, or Firm—Fleit, Jacobson, Cohn & Price

[57] ABSTRACT

The digital switching module (DSM) is arranged as an LSI device providing digital (p.c.m.) switching for 256 channels in a space-time-space format. It is unidirectional in operation and is capable of switching data (digitally encoded speech) from any incoming channel to any outgoing channel. It is arranged to act as a building block in constructing larger digital switching networks. The DSM can be programmed to permit combinations of parallel or serial operation at input and output data interfaces, the mode being selected by the length of the pulse width of the frame start reference signal. The switching configuration of input channels to output channels is held within the DSM and can be amended by messages sent along a serial control interface. Interrogation of the switching state and of the data passing through the switch is provided by messages applied to an output control interface. The DSM can be arranged into square arrays to provide full availability switching for a greater number of channels. Three programming pins are provided which influence the control logic of the DSM to route the control information incoming to a square array to the appropriate control store. The array may be grown from 8×8 to 16×16 and to 32×32.

10 Claims, 8 Drawing Figures

TIME DIVISION MULTIPLEX TELECOMMUNICATION DIGITAL SWITCHING MODULES

The present invention relates to digital switching networks for use in telecommunication systems and is more particularly concerned with such networks which employ so-called digital switching modules (DSM's).

OUTLINE OF THE PRIOR ART

It has been proposed in the prior art to construct a digital switching network handling pulse code modulated (p.c.m.) time division multiplex (t.d.m.) links built-up of digital switching modules (DSM's). Each digital switching module comprises a speech or data store, a control store and may include serial-to-parallel conversion and parallel-to-serial conversion on the input and output paths respectively of the module. One particular implementation of a digital switching module (DSM) using serial-to-parallel and parallel-to-serial conversion is disclosed in a paper entitled "Development of a time division switching network usable in a very large range of capacities" given by Messrs. P. Charransol, J. Hauri, C. Athénes and D. Hardy at the 1978 International Seminar of Digital Communication convened by the I.E.E.E. in the United States of America. The digital switching module is shown in FIG. 14 of the above paper and it is implemented using two stores, one for speech samples and the other for control (i.e. time and space switching) purposes with serial-to-parallel converters on the input paths and parallel-to-serial converters on the output paths to provide an 8×8 digital switching module. All the incoming channels (say 32) on each of the eight incoming p.c.m. links served by the digital switching module are written cyclically into the speech store during each frame period. The speech store "write" address is arranged to correspond to the input channel number so that starting at the first address channel 0 of junction 0 will be stored followed by channel 0 of junction 1 etc. up to channel 31 of junction 7 in the 256th location. Reading of the speech store is under the control of the control store and is therefore performed acyclically on an interleaved basis with the operation of the speech store for write operations. The control store is read cyclically with its address corresponding to the output channel number. The contents of the control store are used to address the speech store for the read operation for each channel. Accordingly, the digital switching module controls the switching of input channels to output channels on a time division multiplex basis by the values placed in the control store. Each module serves 256 input and output channels necessitating an eight bit control word for each switching operation. The actual interconnections are specified by the overall switching network control system which causes the necessary control store location to be programmed with the required speech store location address.

In the above mentioned paper, it is shown how digital switching module (DSM's) implemented in "large-scale-integrated-circuit" form can be used to form complex networks by arranging the DSM's in a matrix using a number of stages in series. For example, 2048 channels (i.e. 64 serial t.d.m. junctions) may be handled by a three stage matrix using twenty-four (three stages of eight DSM's per stage) digital switching modules.

AIM OF THE INVENTION

It is an aim of the present invention to provide enhanced facilities for a digital switching module so that it may be more readily used in large modular switching arrays.

According to the invention there is provided a digital switching module for switching any channel on m t.d.m. incoming paths each carrying n digital channels to any channel on m t.d.m. outgoing paths each having n digital channels including a control store and a data store, the data store being adapted to receive and store in a cyclic manner the time division multiplex information stream incoming to the module, the control store being adapted to be read cyclically in synchronism with the channel appearance on the outgoing paths and each location of the control store is adapted to store the identity of the speech store location to be connected to the corresponding outgoing path and channel characterized in that each control store location includes an additional bit which when set causes the contents of the control store to be read out to the corresponding outgoing path.

This has the particular advantage that path trace and check patterns may be interjected into the switching network using the control store of a d.s.m. It also allows a selectable idle pattern to be inserted into unused outgoing channels.

According to a feature of the invention the digital switching module includes control logic which is arranged to receive and transmit switching connection control information and each input control message defines the control store location and the control operation to be performed and each output control message is generated in response to an input control message.

According to a further feature of the invention each digital switching module includes programming pins which enable easy expansion of the device into arrays to form larger switching modules. The programming pins are used in conjunction with corresponding bits in an input control message to condition the control store of an array for reception of an input control message to the exclusion of the outer d.s.m's of the array.

According to another feature of the invention the d.s.m. data interfaces are programmable to operate in one of four selectable modes, made up of input/output combinations of serial and parallel data formats and the data mode required is established in accordance with the pulse width of a frame start signal associated with the timing signals for the incoming information stream.

The invention together with its various features will be more readily understood from the following description which should be in conjunction with the accompanying drawings.

DETAILED DESCRIPTION

The digital switching module (DSM) may be constructed as a large scale integrated device providing digital switching for 256 channels. It is unidirectional in operation and is capable of switching data from any incoming channel to any outgoing channel. Each data channel is encoded into 8 binary bits and presented at an 8 KHz rate. The input and output channels are time multiplexed onto 8 data input and 8 data output lines. The DSM may be programmed to permit combinations of parallel or serial operation at its input and output data interfaces. The switching configuration of input channels to output channels is held within the DSM and can be amended by messages sent along a serial input control interface. Interrogation of the switching state and of the data passing through the switch is provided by messages applied to a serial output control interface. Two timing signals are applied to the DSM. One provides the high frequency reference for strobing all inputs and outputs while the outer clock defines the frame alignment of both incoming and outgoing PCM lines.

Figure 1:
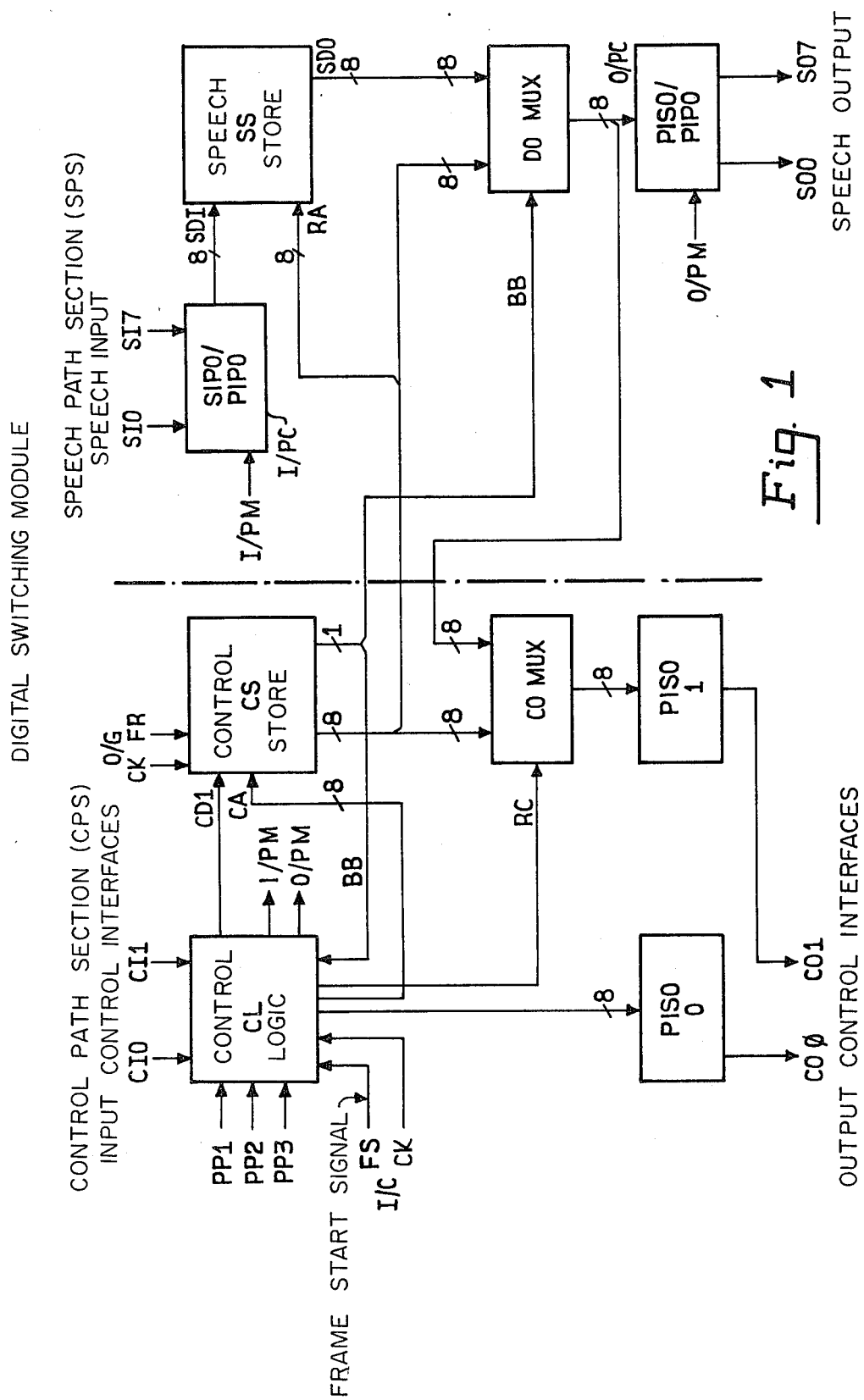
FIG. 1 shows in block diagram form the equipment required for a digital switching module according to one embodiment of the invention.

Considering now FIG. 1 it will be seen that the digital switching module consists of two sections, (i) a speech path section SPS and (ii) a control path section CPS. In FIG. 1 a number of paths are shown with an oblique line on them and a number 8 by that line. This is intended to indicate that the path is an eight lead parallel path.

The speech path section SPS consists of speech or data input and output paths SI and SO and a speech or data store SS providing full availability switching from 256 input channels to 256 output channels. The incoming information, on path SI, may either be in serial or parallel form and it is applied to an input converter I/PC which may be selectably operated as a serial-in parallel-out (SIPO) or parallel-in parallel-out (PIPO) device. The speech store is arranged to receive, for each time division multiplex channel, an eight-bit parallel word on leads SDI and to output an eight-bit parallel word on leads SDO providing full availability switching from 256 input channels to 256 output channels.

As mentioned above the DSM data interfaces I/PC and O/PC may be programmed to operate in one of four modes. The four operating modes are made up of input/output combinations of serial and parallel data formats. The operating modes are:

(a) Serial In/Serial Out
(b) Serial In/Parallel Out
(c) Parallel In/Serial Out
(d) Parallel In/Parallel Out In the serial data format each data line carries a serial 8-bit word in each channel at 2.048 Mb/s. This allows 32 channels per data line, making up the total of 256 channels over the 8 data lines.

In the parallel data format the 8 data lines make up an 8-bit highway, operating at 2.048 Mb/s. This accounts for 256 data channels.

Figure 3:
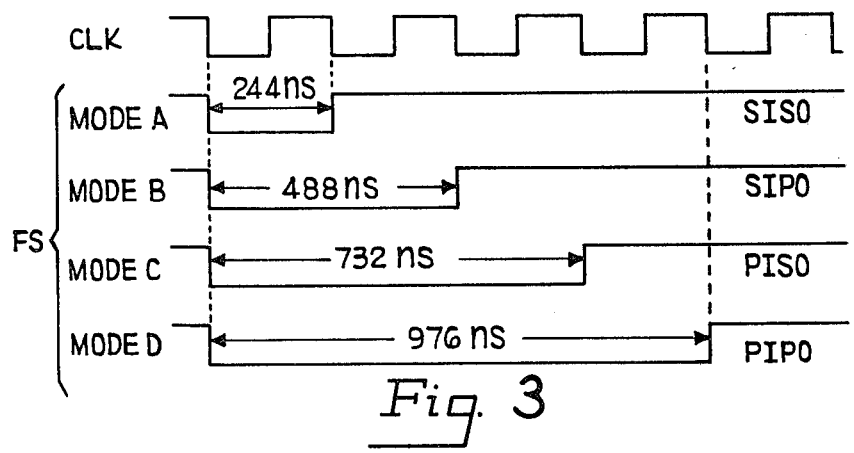
FIG. 3 shows a timing diagram relating to the frame start signal and the four input/output combinations of serial and parallel data formats selectable thereby.

The DSM data mode is selected by varying the pulse width of the low frequency frame start I/CFS reference in discrete steps of 244 ns. Four frame start options are recognized by the DSM which are used to program the data mode. The four frame start options are shown in FIG. 3 with nominal frame start pulse widths.

The control path section CPS (FIG. 1) consists of a control logic CL fed from two input control interfaces CI0 and CI1, a control store CS and an output control interface CO0 and CO1.

Figure 4A:
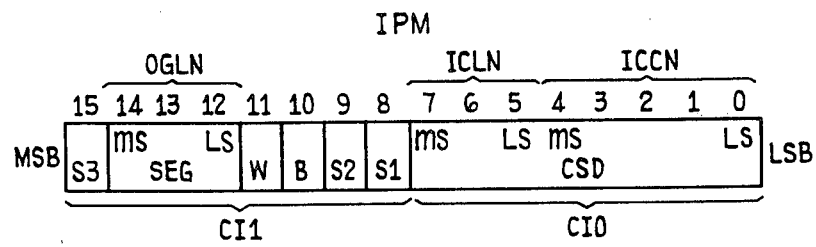
FIGS. 4(a) and 4(b) show the format of input and output control message words together with a control message address word.
Figure 4B:
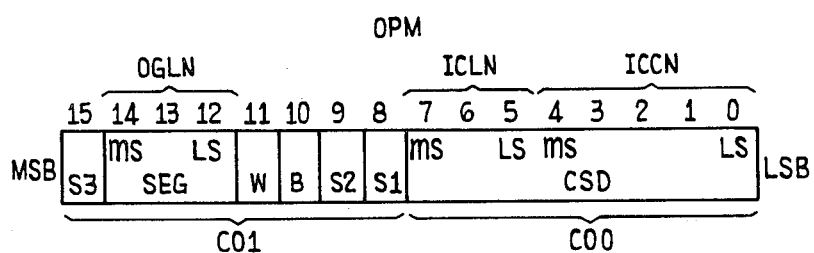
Figure 4C:
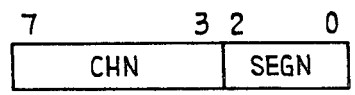
FIG. 4(c) shows the format of an additional address word defining a segment number and a channel number.

The input control interface CI0 and CI1 consists physically of two serial negative logic polarity input lines each operating at 2.048 Mb/s. Each input message consists of a 16-bit word, bits 0–7 arrive on control input CI0 while bits 8–15 arrive on control input CI1. The input message format of an 8×8 DSM is shown in FIGS. 4(a) and 4(c). Bits 15 and 7 are received first. Bit 0 is the least significant, bit 15 is the most significant bit.

Each 16-bit input message is received in one of 32 channels. One of 32 store addresses is defined by the channel number in which the message is received. Since there are 256 store addresses additional address information in the form of a 3-bit segment number is supplied to the DSM in the input message. Together, the segment field and the channel in which the message is received are used to fully specify the control store addresses. The address construction is shown in FIG. 4c.

The significance of the fields in FIG. 4 are as follows:

| Bit Nos | Significance |
| --- | --- |
| 15 | S3 |
| 12–14 | SEGMENT Number used to construct address |
| 11 | Write bit |
| 10 | External Busy Bit |
| 8 and 9 | S1 and S2 |
| 0–7 | Control Store Data |

S1, S2 and S3 are used to identify a DSM in an array.

The control store CS includes 256 locations which in the operation of the digital switching module in its switching mode are read cyclically in synchronism with the outgoing path clock O/G CK and are used to address the speech store SS for a read operation. Each control store location also includes a so-called busy bit which on lead BB (FIG. 1) is used to control the data multiplexor MUXDO to select either the output of the speech store SS or the control store CS for application to the speech (data) output path SO. This arrangement allows the busy bit BB to be used to inject control information patterns into a speech or data network using digital switching modules. This arrangement has particular significance as far as the injection of path trace or check signals is concerned and could be used for distributing control information in a complex network made up of digital switching modules.

Switching Operation of the Module

Figure 2:
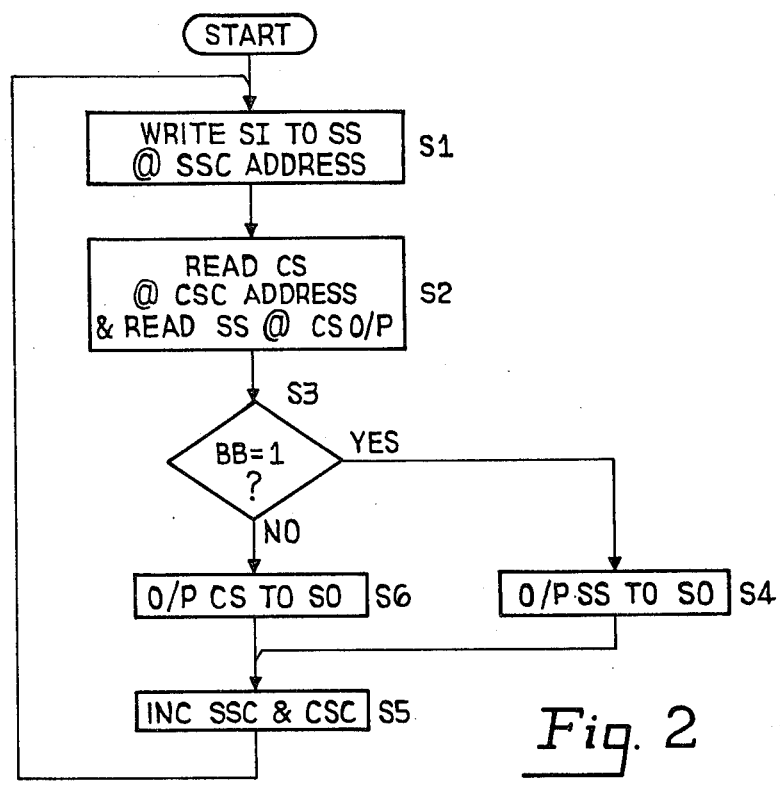
FIG. 2 shows in flow diagram form the information switching operations performed by a digital switching module according to the embodiment of the invention.

The operation of the digital switching module is shown in flow diagram form in FIG. 2 and the following description will be sectionalised under the stages S1 to S6 of FIG. 2.

Step S1 Write SI to SS

Incoming data samples are stored in the 256-location speech store SS. Each incoming data sample is stored in a location corresponding to its line and channel numbers. When the DSM is operating in one of the Serial-In modes, there will be eight incoming lines each of 32 channels served by the d.s.m. When operating in one of the Parallel-In modes, there is effectively only one incoming parallel highway time division multiplexed into 256 channels.

Step S2 READ CS

Information received across a control interface is held in a control store. The control store is read cyclically and the information read out of the control store is used in this step as the "read" address for the speech store SS.

Step S3 BB=1

There is a stored internal busy bit associated with each outgoing channel. The states of the internal busy bits can be altered by external control. The busy bits are used to influence the action of the trunking as described below.

When the busy-bit is set, this indicates that there is data (speech) in the Outgoing Channel. The condition of the DSM internal busy bit, BB, in each control store location is examined to determine whether the outgoing channel is busy or not busy.

Step S4 O/PSS to SO

If the channel is found to be busy when the control store location is read (BB set), then the contents of the appropriate speech store SS location are to be presented to the current outgoing line and channel, so accomplishing the speech switching function. The read address of the control store CS corresponds to the current output line and channel. Note that when the DSM is operating in one of the Serial-Out modes, there are eight outgoing lines SO each of 32 channels. When operating in one of the Parallel-Out modes, there is effectively only one outgoing parallel highway time division multiplexed into 256 channels.

Step S5 INC SSC and CSC

In this step the speech store SS and control store CS address counters (referred to as SSC and CSC respectively) are incremented by one by the respective clock pulses CK ready for return to step S1 and the handling of the next time division multiplex channel.

Step S6 O/P CS to SO

If the result of the test in Step S2 is NO it indicates that the outgoing channel is not busy (BB not set) when the control store CS location is read, the contents of the control store, but not the busy bit, are presented to the current line and channel. The 8 bits of the control store will be applied to bits 1-8 of the output channel.

From the above it can be seen that the incoming t.d.m. channels are written cyclically into corresponding speech store SS locations in an interleaved manner under the control of the incoming clock. For example, for "serial-in serial-out" operation of the d.s.m. the speech store locations are used as follows:- at speech store location 0 the data in channel 0 of the first input path SI0 is stored; at store location 1 the data in channel 0 of the second input path SI1 is stored; etc. up to store location 255 in which the data in channel 31 of the eighth input path SI7 is stored. For each outgoing channel bit time the control store CS is read and the information read-out is used, if bit BB is set, to address the speech store SS for a read operation and the information read from the speech store is fed serially out over the relevant outgoing path from the d.s.m. in the selected channel. Alternatively if the busy bit BB is not set, the output of SS is "replaced" by the output of the control store CS.

There is a finite delay associated with the propagation of speech data through the DSM, so that data in an outgoing line and channel is delayed by a finite time with respect to data incoming in the corresponding line and channel.

In addition to the propagation delay, a speech or data sample experiences a storage delay of up to 1 frame. This delay depends on the relationship between the input and output lines and channels of the data sample. Speech data is written to the speech store before the contents of the corresponding control store location are used to read the speech store. As a consequence of this, if data incoming on line "a" channel "n" is to be switched to line "b" channel "n", then each data sample experiences only its propagation delay, i.e. there is a zero frame delay.

In general it can be seen from the organization of speech store and control store that for channel "n" to channel "n" switching, data experiences a 0 frame delay if the outgoing line number is greater than or equal to the incoming line number; but a 1 frame delay if the outgoing line number is less than incoming line number.

The switching delay characteristics for channel n to channel n switching is summarised in the table below:

| Line a Ch n to Line b Ch n | Frame Delay |
| --- | --- |
| a > b | 1 |
| a ≤ b | 0 |

When the incoming channel number is different from the outgoing channel number, in addition to the propagation delay, each speech data sample experiences a delay which is proportional to the distance in time between its incoming and outgoing channels. For a connection from line a channel m to line b channel n, when $m \neq n$, incoming data in channel m experiences a switching delay of $$(n - m) 3.90625 + \left(1 - \frac{n - m}{|n - m|}\right) 6.25 \, \mu S.$$

Consideration will now be given to the operations necesary to control the information in the control store CS.

Module Control Operations

As mentioned previously the control operations performed by the d.s.m. depend upon the information sent in an input control message (IPM FIG. (a).

The control operations performed by the DSM depend on the states of bits 8-11 and bit 15 of the input control message. These bits are used by the DSM as described below.

Write and Read Control Store

TABLE A

| 15 | 11 | 10 | 9 | 8 |
| --- | --- | --- | --- | --- |
| S3 | 1 | X | S2 | S1 |

The table A shown above defines the input conditions of bits 8–11 and bit 15 which cause a Write and Read Control Store operation to be performed.

The control logic CL in the DSM compares S1 with programming pin 1 (PP1), S2 with programming pin 2 (PP2), and S3 with programming pin 3 (PP3).

The following actions occur ONLY IF S3 is equal to PP3:

If S1=PP1 and S2=PP2 then the specified Control Store location is loaded with the data found in bits 0–7 and bit 10 of the input control message.

If either S1≠PP1 or S2≠PP2 then the specified control store location including the busy bit is overwritten with all zeros.

If the contents of the control store or the internal busy bit are non-zero, then the values of PP1, PP2 and PP3 are sent respectively in bits S1, S2 and S3 of the output control interface (along with the contents of the control store). If the contents of the control store including the internal busy bit are zero then zero is sent in bits S1, S2 and S3 of the output control interface. The segment number and the write bit of the incoming message are also returned in the outgoing message.

If S3 is NOT equal to PP3 then the DSM does not alter any internal data, but puts all zeros onto the control output.

Read Control Store

TABLE B

| 15 | 11 | 10 | 9 | 8 |
|----|----|----|---|---|
| S3 | 0  | 1  | X | X |

Table B shown above defines the input condition of bits 8–11 and bit 15 which cause a Read Control Store operation to be performed. If S3=PP3 then the DSM sends to the output control interface the contents of the control store at the specified location. When S3≠PP3 then the DSM sends all zeros to the output control interface.

If the contents of the control store or the internal busy bit are non-zero and S3=PP3, then the values of PP1, PP2 and PP3 are sent respectively in bits S1, S2 and S3 of the output control interface. Whenever S3=PP3 the write bit and the segment number are returned in the outgoing message. If the contents of the control store including the internal busy bit are zero or S3≠PP3, then zero is sent in bits S1, S2 and S3 of the output control interface.

Read Output Speech Channel

TABLE C

| 15 | 11 | 10 | 9 | 8 |
|----|----|----|---|---|
| S3 | 0  | 0  | X | X |

Table C shown above defines the input conditions o bit 8–11 and bit 15 which causes a Read Output Speech Channel operation to be performed.

If S3≠PP3 then all zeros are sent to the output control interface.

The following actions occur ONLY IF S3=PP3.

The DSM examines its internal busy bit (BB) at the specified control store location.

If BB=1 the DSM sends the contents of the data or speech Store SS at the location defined by the contents of the control store to the output control interface. Bits 1 to 8 of the speech channel will be output on bits 7 to 0 of the control interface respectively (i.e. as it would appear on a serial data input or output ms bit first). The internal busy bit and the values of PP1, PP2 and PP3 are also sent respectively in the busy bit position S1, S2, and S3 of the output control interface together with the write bit and segment number.

If BB=0 the DSM sends the contents of the Control Store at the specified location and the busy bit (=0) to the output control interface. If the control store contents were found to be zero, then bits S1, S2 and S3 are set to zero in the output control message, otherwise S1, S2 and S3 are set to PP1, PP2 and PP3 respectively. Also the segment number and write bit are returned in the outgoing message.

The information sent by the d.s.m. to the network control system uses the Output Control Interface CO0 CO1 which consists physically of two serial output lines each operating at 2.048 Mb/s. Each output message will consist of a 16-bit word, bits 0–7 appear on output line $\emptyset$ while bits 8–15 appear on output line 1. Bit 15 and 7 are transmitted first. Every message appearing at the output control interface does so in response to a specific command received at the input control interface and bears a fixed timing relationship with the appropriate input control message. The output message format of an 8×8 DSM is shown in FIG. 4(b) and each 16-bit output message is transmitted in one of 32 channels. The output message is associated with an address which is defined by the segment field and the channel in which the message is transmitted.

The bit significance of the fields in FIG. 4b for an output control message OCM is as follows:

| Bit Nos. | SIGNIFICANCE |
|----------|--------------|
| 15       | S3 |
| 12–14    | SEGMENT No. This is a reflection of the segment number in the input message |
| 11       | Reflected Write bit |
| 10       | Busy bit. This is the DSM internal busy bit BB |
| 8 and 9  | S1 and S2 |
| 0–7      | Data Field. This may be either Speech data of Control Store data, depending on the DSM action. |

Apart from the channel synchronization of the control interface there is no constraint on the sequence of DSM commands; a different command, with different segment number, can be sent in successive channels if required.

Figure 5:
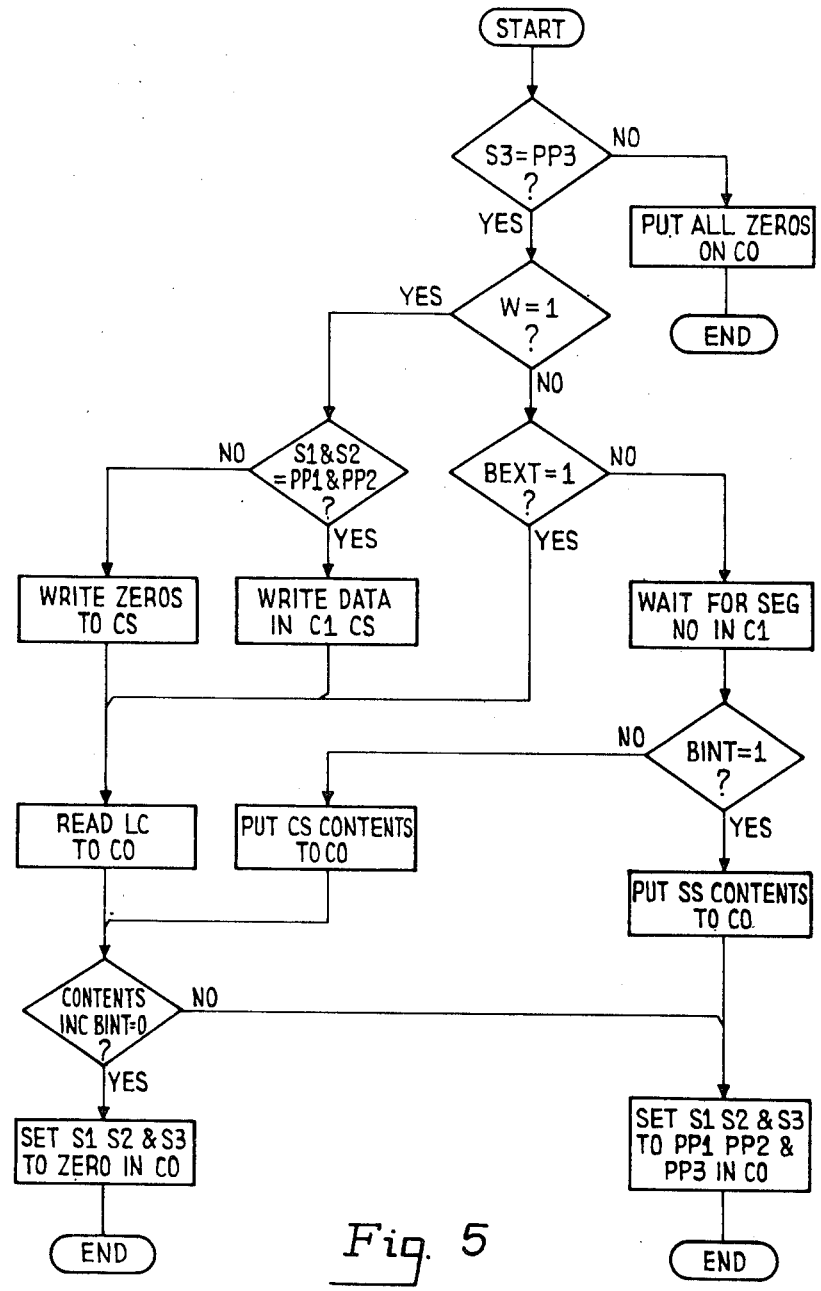
FIG. 5 shows the flow diagram of the operations performed for various input control messages.

Similarly if it is necessary for the exchange network control to interrogate either a control store location or a speech store location, a read input control message is used and signal RC controls the output multiplexor COMUX. FIG. 5 shows the flow chart summarising the operations performed by the control logic CL for the various control interface operations which were specified above.

Figure 6:
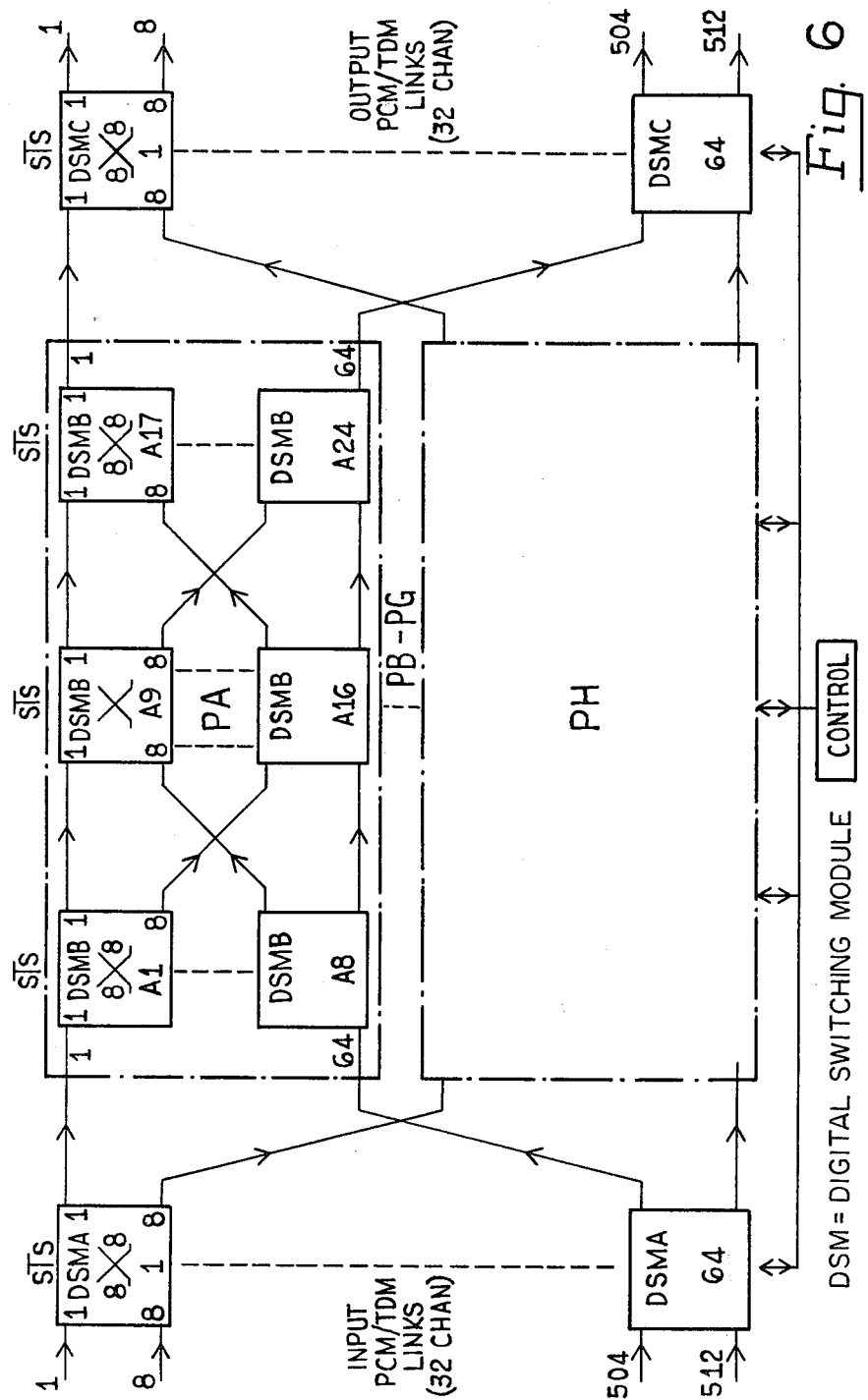
FIG. 6 shows in block diagram form a switching network using digital switching modules according to the embodiment of the invention.

FIG. 6 shows in block diagram form how a switching network may be constructed using 8×8 "serial-input/-serial-output" digital switching modules. The network of FIG. 6 includes a five stage switch for 16,384 channels employing 320 digital switching modules. The network is organized such that any particular path across the network has a choice of one DSM for the first (DSMA 1 to 8) and fifth (DSMC 1 to 8) stages, eight DSM's for the second and fourth stage (one DSM in each of the eight three-stage planes PA to PH) and 64 DSM's for the third stage (any one of the eight centre DSM's in each of the eight planes). The actual paths used are set by the network CONTROL sending input control messages to the DSM's to be used for the connection.

The network of FIG. 6 uses discrete DSM's individually arranged to provide 8×8 switching. In certain circumstances it is advantageous to have larger switching "modules".

To accommodate expansions of d.s.m.'s into arrays to form larger switching modules the three programming pins PP1, PP2, and PP3 are provided as mentioned above. These pins are arranged to operate in conjunction with bits S1, S2 and S3 in the input control interface as defined above. Illustrations of their use are shown in FIGS. 7 and 8.

Control Interface to a 16×16 DSM

The format of the control interface to a 16×16 DSM is the same for both possible implementations of the DSM; the 16×16 DSM can be a single device, or constructed from four 8×8 devices.

Figure 7:
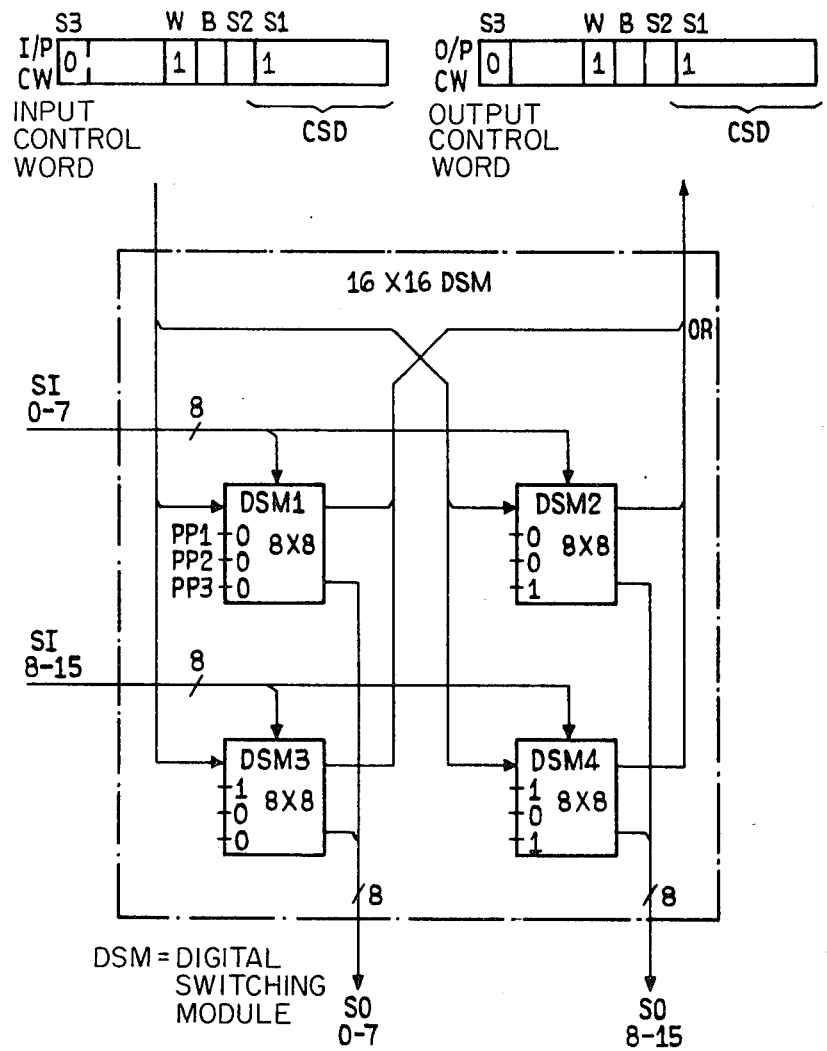
FIG. 7 shows how four d.s.m's may be used in an array to form a 2N×2N switch.
Figure 8:
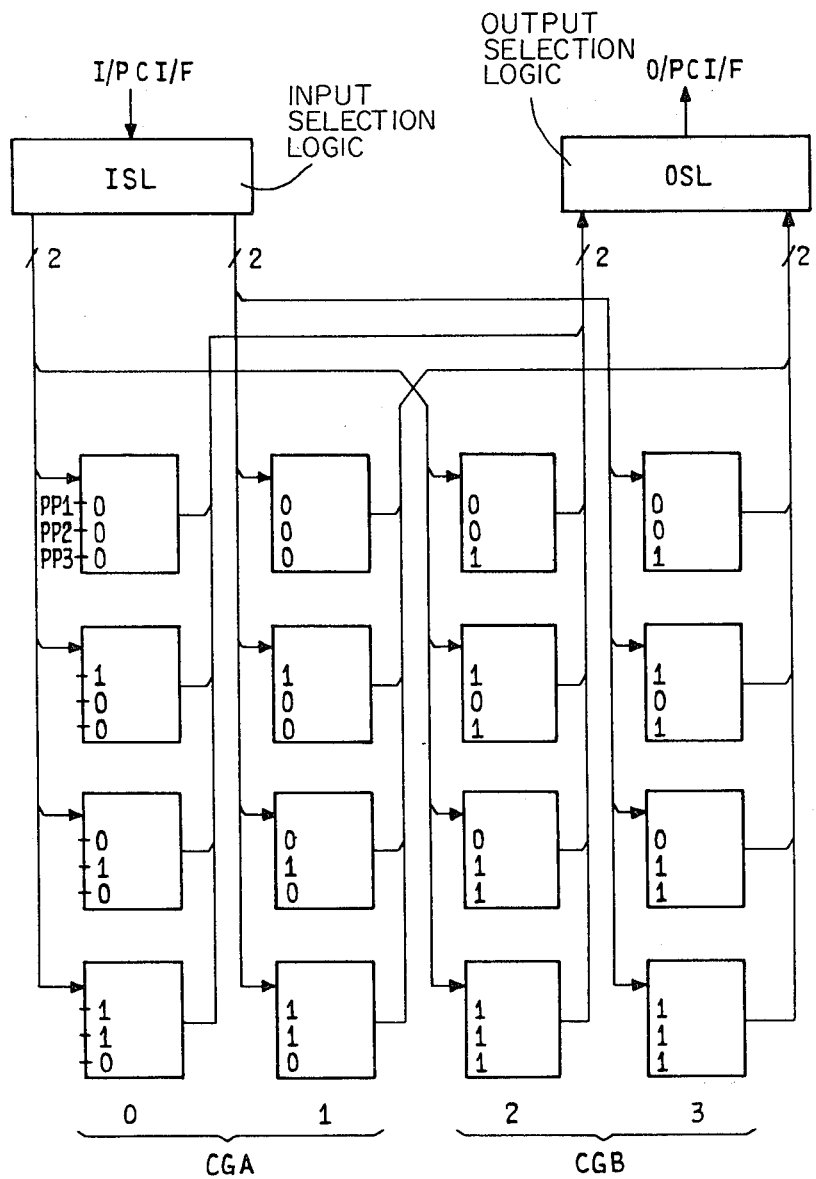
FIG. 8 shows how sixteen d.s.m.'s may be used in an array to form a 4N×4N switch.

When a 16×16 is configured from four 8×8s the speech highways are shared by DSMs as shown in FIG. 7. The control highways are arranged as shown in FIG. 7 identical control information goes to all 4 devices.

The input message format is as shown in FIG. 4(a) except that bit 15 is used as follows: Bit 15 carries the most significant bit of a 4 bit segment number. This 4 bit number represents the Outgoing Line Number, its most significant bit is the DSM Column No. DSM Column 0 (on the left of FIG. 7) puts speech data out on lines 0-7, DSM Column 1 puts speech data out on lines 8-15.
Programming Pin 3 is used to distinguish DSM Column Nos.
Programming Pin 1 is used to distinguish DSM Row Nos.

Thus together PP1 and PP3 uniquely specify a DSM position in the array of 4.

There is no need for any external logic to make a 16×16 from four 8×8s.

DSM Internal Logic for Write

Each DSM compares bit 15 of the input message with its PP3. Bit 15 is used to select the control DSM column. The deselected column DSMs do not alter their control stores, but output zeros on their control outputs, so that they do not affect the output from the selected DSM Column.

DSMs in the selected column compare S1 (bit 8 of the input message) with their programming pins 1 (PP1) so that the correct DSM is selected for a WRITE operation.

The selected DSM puts data in its control store and copies the busy bit from the input message. The deselected DSM puts zeros in its control store and puts the busy bit to zero (not busy).

DSM Read

In a Read operation all 4 DSMs output a data word. The write mechanism described above guarantees that only one of these words is non-zero. All 4 control outputs can, therefore, be combined in a Wired-Or configuration and sent to the external control.

Control Interface to a 32×32 DSM

There is not enough information in the input control message to specify one of the 1024 locations in a 32×32 DSM. However, it is anticipated that with advances in technology it will become feasible to operate the control interfaces of the DSM at 4.096 Mb/s. This would provide 64 16-bit channels for control information, so enabling an 8-bit address to be constructed.

The control of sixteen 8×8 DSMs configured as a 32×32 DSM is described below.

Input Control Interface

FIG. 8 shows the interconnection of control interfaces for the 16 DSMs in a 32×32 configuration. Programming pins PP1 and PP2 are compared with S1 and S2 respectively of the incoming message to identify one of 4 DSM rows.

Programming pin PP3 is compared with S3 of the incoming message to distinguish between one of two DSM input control column groups. A column group consists of two input control columns as shown in FIG. 7.

The least significant bit of the incoming channel number is used externally to the DSM to select one of two columns in a group. This column selection can be implemented with the Input Selection Logic consisting of a D type toggle driven from a 512 KHz (2.048 MHz divided by four) clock driving the enable of a 1:2 demultiplexor.

Note that with additional circuitry it would be possible to retime the control interfaces at the demultiplexor output to 2.048 Mb/s to drive a DSM with a 2.048 Mb/s control interface.

Output Control Interface

The output control interface is connected as shown in FIG. 8. The output selector logic can be implemented using a 2:1 multiplexor driven from the retimed output from the D type toggle used in the input control interface.

The DSM selection logic ensures that when a DSM outputs control information all other DSMs connected on the same output control interface output all zeros. This permits DSM control outputs to be combined in a Wired-Or configuration as in FIG. 8.

The above description has been one embodiment only and alternative arrangements will readily be seen by those skilled in the art. For example, separate counters are used to control the two stores of the digital switching module, however, a single counter addressing the same numbered location in each store could be used. It will also be realised by those skilled in the art that the digital switching module is ideally suited for large scale integrated circuit fabrication with the control logic implemented using a suitably programmed uncommitted logic array.

What we claim is:

1. In a digital switching module for switching any channel on m time division multiplex incoming paths each carrying n digital channels to any channel of m time division multiplex outgoing paths each having n digital channels for use in a time division telecommunications switching network comprising a plurality of stages of such modules and each module includes a control store and a data store, the data store being adapted to receive and store in a cyclic manner the time division multiplex channels on the incoming paths in such manner that each individual time division multiplex channel is allocated an individual data store location on a mutually exclusive basis and whereas the control store is adapted to be read cyclically in synchronism with the channel appearance on the outgoing paths, each individual location of the control store being adapted to store the identity of the data store location to be used to supply the data for the corresponding outgoing path and channel, the improvement comprising an additional control indicator for each control store location which when set to a predetermined state causes the contents of the control store location currently being selected to be used to supply the data for the corresponding outgoing path and channel to replace the contents of data store location, and each digital switching module includes:

first means for inhibiting the application of the output path of the data store to the outgoing path of the module, second means for connecting the output path of the control store to the outgoing path of the module, and third means for detecting the set state of said additional control indicator for causing the contents of the control store currently being selected to be used to supply data for the corresponding outgoing path and channel to replace the contents of data store locations.

2. A digital switching module according to claim 1, in which control logic is provided, arranged to receive and transmit switching connection control information from and to the switching network control equipment.

3. A digital switching module according to claim 2, in which the control logic is adapted (i) to receive input control messages which define a control store location and a control operation to be performed involving that location and (ii) to generate an output control message in response to an input control message.

4. A digital switching module according to claim 3, in which the input control messages are distributed to the digital switching module using an input control path operated in a time division multiplex manner, and the channel on the input control path used for an input control message together with a segment address included in the input control message is used by the control logic in the digital switching module to define the control store location address to be used in the operation defined by the said input control message.

5. A digital switching module according to claim 4, in which the output control messages are distributed from the digital switching module to the network control equipment using an output control path operated in a time division multiplex manner and the channel on the output control path used for an output control message together with a segment address included in the input control message indicates the control store location address relevent to the output control message.

6. A digital switching system according to claims 3, 4 or 5 in which the input control message includes a write indicator and an external busy indicator and the control logic is arranged when the write indicator is active to cause the data accompanying the input control message to be written into the specific control store location and the additional control indicator of that location to be set to the state of the external busy indicator.

7. A digital switching module according to claim 6 in which the control logic is arranged when the write indicator is inactive to cause (i) the contents of the control store location to be used for the output control message when the external busy indicator is in its active state or (ii) the contents of the data store location to be used for the output control message when the external busy indicator is in its inactive state.

8. A digital switching module according to claim 7 in which the data interfaces are programmable to operate in one of four selectable modes comprising input/output combinations of serial and parallel data formats and the data mode required is established in accordance with the pulse width of a frame start signal distributed to the digital switching module from the network control equipment.

9. A digital switching array including a plurality of digital switching modules according to claim 8 arranged in a symetrical array and each digital switching module in the array is allocated a discrete array address identification code and each input control message includes an array address identification code indicative of the digital switching module in the array.

10. A digital switching network including a plurality of stages, each stage consisting of a plurality of digital switching modules according to claim 8.

* * * * *